United States Patent [19]

Yallourakis

[11] 4,122,060

[45] Oct. 24, 1978

[54] EPOXY RESIN POWDER COATING COMPOSITION

[75] Inventor: Michael Dimitri Yallourakis, Wilmington, Del.

[73] Assignee: E. I. Du Pont de Nemours and Company, Wilmington, Del.

[21] Appl. No.: 877,997

[22] Filed: Feb. 15, 1978

Related U.S. Application Data

[63] Continuation-in-part of Ser. No. 807,058, Jun. 16, 1977, abandoned.

[51] Int. Cl.$^2$ .................. C08L 63/04; C08L 63/02
[52] U.S. Cl. .................. 260/37 EP; 260/830 TW
[58] Field of Search .................. 260/37 EP, 830 TW

[56] References Cited

U.S. PATENT DOCUMENTS

| | | | |
|---|---|---|---|
| 3,028,251 | 4/1962 | Nagel | 117/21 |
| 3,400,098 | 9/1968 | Parry | 260/37 EP |
| 3,484,398 | 12/1969 | Childs | 260/18 EP |
| 3,819,562 | 6/1974 | Gindrup et al. | 260/37 EP |
| 3,876,606 | 4/1975 | Kehr | 260/37 EP |
| 3,882,064 | 5/1975 | Pregmon | 260/28 |

Primary Examiner—Lewis T. Jacobs

[57] ABSTRACT

Epoxy resin powder coating compositions which have good shelf-life and which are capable of rapid cure are obtained by blending two types of epoxy resins with filler particles and a curing agent. One resin is of the epichlorohydrin-bisphenol-A type. The other resin is an epichlorohydrin-bisphenol-A epoxy modified with an epoxy-novolac. Rapidly curing films are obtained by using a hydroxy-containing, mixed aromatic-aliphatic polyether resin crosslinking agent. The cure is accelerated with an alkylimidazole. These compositions are useful in coating metal substrates, particularly pipe exteriors, when rapid cure, flexibility, and good adhesion are needed.

13 Claims, No Drawings

EPOXY RESIN POWDER COATING COMPOSITION

CROSS-REFERENCE TO RELATED APPLICATIONS

This application is a continuation-in-part of copending application Ser. No. 807,058 filed June 16, 1977, now abandoned.

BACKGROUND OF THE INVENTION

1. Field of the Invention

This invention is related to thermosetting powder coating compositions and particularly to compositions containing epoxy resins.

2. Description of Prior Art

Epoxy resin powder coating compositions which are capable of being crosslinked and various agents which effect the crosslinking are well known. The prior art contains numerous references to compositions which contain epoxy polymers and to conventional crosslinking agents such as anhydrides or amines.

U.S. Pat. No. 3,882,064 issued May 6, 1975 to W. Pregmon, discloses thermosetting powder coating compositions based on an epoxy resin of the epichlorohydrin-bisphenol-A type crosslinked by dicyanidiamide. Similar powder coatings are shown by Nagel, U.S. Pat. No. 3,028,251, issued Apr. 3, 1962; and Parry, U.S. Pat. No. 3,400,098, issued Sept. 3, 1968. Dicyandiamide-cured compositions can be water sensitive and therefore are not well suited to be pipe coatings. No disclosure is made in these patents as to the resistance of their respective compositions to adhesion loss under cathodic protection.

Powder coatings which cure rapidly and have resistance to adhesion loss when subjected to cathodic protection are particularly demanded by the pipe industry. The prior art coatings capable of curing in less than 2 minutes at 200° C. have been commonly found to lose adhesion when subjected to cathodic protection. Pipes are often subjected to cathodic protection, after burial in the ground, by connecting them to the negative terminal of a direct voltage source. It is important that the coating not lose adhesion under these conditions.

U.S. Pat. No. 3,819,564, issued June 25, 1974 to W. Gindrup and A. J. Siegmund, Jr., discloses thermosetting powder coating compositions based on epichlorohydrin-bisphenol-A epoxy resins cured by aromatic anhydrides and hydroxypyridines. This composition is said to cure in 45 seconds at 200°-230° C. and has acceptable resistance to adhesion loss during cathodic protection. However, its flexibility is less than that exhibited by coatings which require more than 2 minutes to cure.

The use of blends of epichlorohydrin-bisphenol-A epoxies and novolac epoxies in powder coating compositions is shown, for example, in U.S. Pat. No. 3,484,398, issued Dec. 16, 1969 to W. I. Childs in which a silica filler and anhydride curing agent were used. These compositions, formulated to serve either a molding or coating function, are deficient with respect to certain desirable coating composition properties, notably cure-time and flexibility, when compared to compositions designed for use solely as coatings.

The use of curing agents other than the conventionally used anhydrides and amines is also part of the art. An agent, believed to be a hydroxy-containing aromatic-aliphatic ether, specially designed for use in curing epoxy resin powder coatings, is shown in Dow Chemical Company Technical Data pamphlet entitled "Dow Experimental Hardener XD-8062," dated Mar. 2, 1975. Some of the disclosed uses for this curing agent are in compositions based on epoxy resins similar to those used in the present invention. These compositions exhibit acceptable flexibility and adhesion but require a relatively long cure time.

Therefore, there remains a need for an epoxy resin powder coating composition which cures rapidly, preferably in less than 2 minutes at commercially acceptable temperatures, and which has good adhesion, adhesion retention under cathodic protection, and flexibility.

SUMMARY OF THE INVENTION

According to the present invention, there is provided a thermosetting powder coating composition which consists essentially of finely divided particles at least 90 percent by weight of which have a maximum dimension not exceeding 150 microns. The particles are a blend of a composition of:

(A) 9-25 parts by weight of an epoxy resin of the formula

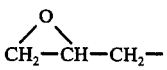

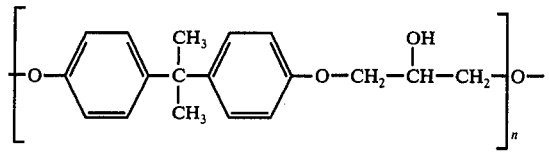

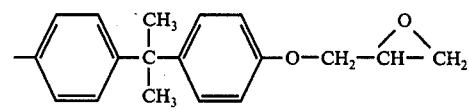

where $n$ is sufficiently large to provide a resin having a Gardner-Holdt Viscosity of H-L measured at 40 percent polymer solids in diethylene glycol n-butyl ether at 25° C. and having an epoxide equivalent weight of 575-700;

(B) 0.9-3 parts by weight of an epoxy resin having the same general formula as (A) but having a value for $n$ sufficiently large to provide a resin having a Gardner-Holdt Viscosity of K-P measured as above and having an epoxide equivalent weight of 660-810;

(C) 20-38 parts by weight of an epoxy/epoxy novolac resin which is an epoxy resin of the formula of (A) modified with an epoxy novolac resin of the formula

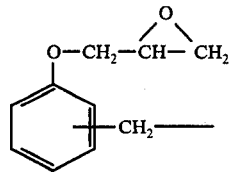

-continued

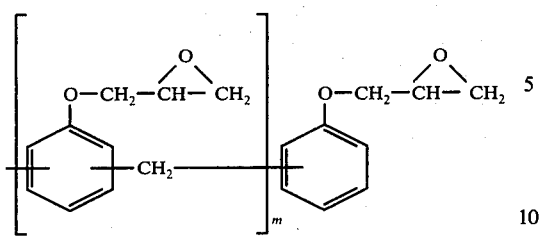

where *n* of the epoxy resin and *m* of the epoxy novolac resin have values sufficiently large to provide an epoxy/epoxy novolac resin having a Gardner-Holdt Viscosity of W-Z measured as in (A) and having an epoxide equivalent weight of 750–860;

(D) 0–25 parts by weight of an epoxy/epoxy novolac resin of the formula of (C) but having values for *n* and *m* sufficiently large to provide an epoxy/epoxy novolac resin having a Gardner-Holdt Viscosity of O-S measured as in (A) and having an epoxide equivalent weight of 500–575 wherein the parts by weight of components (C) and (D) total at least 34;

(E) 10–20 parts by weight of filler particles having a maximum dimension of 10 microns; and (F) 18–25 parts by weight of a resinous curing agent consisting essentially of:
1. 68–81 parts by weight of a compound of the formula

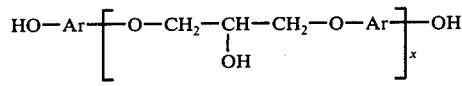

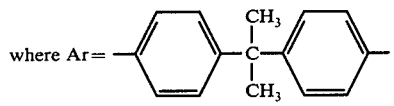

and *x* is a positive number sufficiently large to provide a compound with a weight average molecular weight of 1250–1600, as determined by Gel Permeation Chromotography based on a linear calibration curve obtained from narrow molecular weight polystyrene standards;
2. 17–30 parts by weight of bisphenol-A; and
3. 0.6–2.0 parts by weight of an alkylimidazole in which the alkyl group contains 1–4 carbon atoms.

DESCRIPTION OF THE INVENTION

It has been found that the epoxy resin powder coating composition of this invention unexpectedly eliminates the disadvantages of the prior art with respect to speed of cure, flexibility, and adhesion retention. The desirable aspects of the prior art coatings have been incorporated by the new composition to an unexpected degree.

The coating composition of this invention has a powder particle size such that at least 90 percent by weight of the particles have a maximum dimension not exceeding 150 microns and preferably none has a maximum dimension exceeding 200 microns. It is preferred that there be a maximum dimension of 10–120 microns and more preferred that it be 40–100 microns.

About 9–25 parts by weight of the powder coating composition is an epoxy resin which is of the epichlorohydrin-bisphenol-A type, of the formula

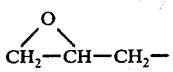
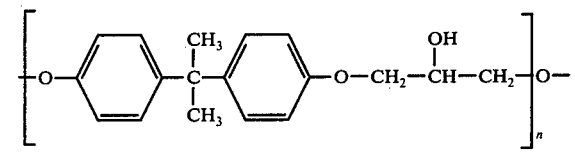
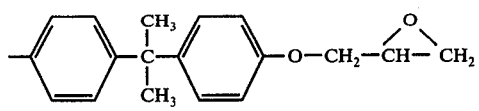

where *n* is sufficiently large to provide a Gardner-Holdt Viscosity of H–L measured at 40 percent polymer solids in diethylene glycol n-butyl ether at 25° C. and the resin has an epoxide equivalent weight of 575–700. The epoxide equivalent weight is the weight in grams of epoxy resin that contains one gram equivalent of epoxide.

Preferably 10–15 parts by weight and most preferably about 11–12 parts by weight of this epoxy resin are used in the powder coating composition.

About 0.9–3 parts by weight of another epoxy resin is used in the composition. This epoxy resin has the same general formula as the above resin and has a Gardner-Holdt Viscosity, measured as above, of K–P and an epoxide equivalent weight of 660–810. Preferably, the weight ratio of this epoxy resin to the first epoxy resin is approximately 0.08/1 to 0.2/1.

About 20–38 parts by weight of an epoxy/epoxy novolac resin is used in the composition. This resin is an epichlorohydrin-bisphenol-A resin of the formula shown above modified with an epoxy novolac resin of the formula

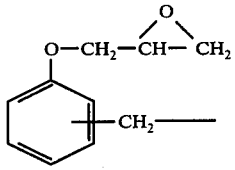
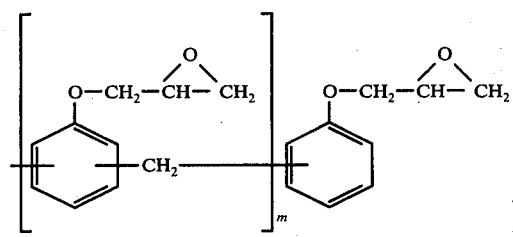

where *n* of the epoxy resin and *m* of the epoxy novolac resin have values sufficiently large to provide an epoxy/epoxy novolac resin having a Gardner-Holdt Viscosity of W-Z, measured at 40 percent polymer solids in diethylene glycol n-butyl ether at 25° C. and having an epoxide equivalent weight of 750–860. Preferably, 22–30 parts by weight of this resin is used.

Epoxy/epoxy novolac resins are formed by modifying an epichlorohydrin-bisphenol-A resin with an epoxy novolac resin. It is believed that the modification is either direct crosslinking of the two resins or indirect crosslinking through reaction of both resins with bisphenol-A.

By varying the ratio of epichlorohydrin-bisphenol-A epoxy to epoxy novolac, the vicosity and epoxide equivalent weight can be varied and epoxy/epoxy novolac resins of different reactivity can be provided.

Optionally, up to 25 parts by weight of an epoxy/epoxy novolac of the same formula as above can be used in the composition. This resin has a Gardner-Holdt Viscosity of O-S, measured as above, and an epoxide equivalent weight of 500–575. Preferably this resin is present in the amount of 20–25 parts by weight, and more preferably 22–23 parts by weight, but the parts by weight of both epoxy/epoxy novolac resins should total at least 34.

To improve abrasion resistance of the coating and to relieve shrinking forces which can occur during curing, the composition contains 10–20 parts by weight of filler particles having a maximum dimension of 10 microns. Conventional particulate fillers which can be used are silica, barium sulfate, calcium carbonate, aluminum silicate, mica, and the like. Preferred fillers are silica, barium sulfate, or mixtures of these. A suitable silica filler, for example, is commercially available under the trademark Min-U-Sil ®5 registered to Pennsylvania Glass Sand Company.

When the composition is used to coat ribbed reinforcing bars or other sharp-edged articles, more uniform edge covering is attained when up to 3 percent by weight, based on the weight of the composition, of fumed silica is added. This is a very fine, amorphous silica formed from silica spheres having an average diameter of 7–14 millimicrons and having large surface area, 200–400 square meters per gram. Such a substance is commercially available from Cabot Corporation as Cab-O-Sil ®.

A curing agent in the amount of 18–25 parts by weight is used in the composition. The agent is resinous in nature and contains:

1. 68–81 parts by weight of a compound of the formula

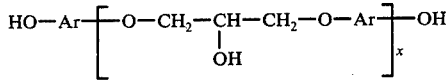

where Ar =

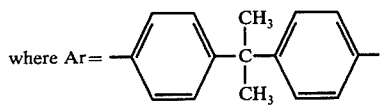

and $x$ is a positive number sufficiently large to provide a compound with a weight average molecular weight of 1250–1600, as determined by Gel Permeation Chromatography (GPC) based on a linear calibration curve obtained from narrow molecular weight polystyrene standards;

2. 17–30 parts by weight of bisphenol-A; and
3. 0.6–2.0 parts by weight of an alkylimidazole in which the alkyl group contains 1–4 carbon atoms. Preferably, the alkyl group is methyl.

With respect to the first component of the curing agent it is preferred for a more flexible coating that the average molecular weight of this component be increased within its range as the parts by weight of the component used in the curing agent composition is increased.

The composition can be pigmented or unpigmented but is usually pigmented and contains a pigment to binder ratio of 3/100 to 30/100. Any conventional inorganic, organic, or filler pigments can be used. Examples of the pigments that can be used in the composition are: metallic oxides such as titanium dioxide, zinc oxide, iron oxide, chrome oxide, and the like; metallic powders; metal hydroxides; sulfides; sulfates; and other filler pigments.

Flow control agents can be added to the powder coating composition in amounts up to 1.0 percent by weight based on the weight of the composition. Typical flow control agents are poly alkylacrylates where the alkyl group contains 2–8 carbon atoms. A suitable substance for this purpose is commercially available under the trademark ModaFlow ® registered to Monsanto Corporation.

One method for forming the powder coating composition of this invention is to blend the components together and then to pass the mixture through a conventional extruder. The extrudate can then be reduced to a powder using conventional grinding equipment. After grinding, the powder is passed through a sieve to remove large particles. Preferably, a sieve which eliminates particles of maximum dimension greater than 150 microns is used but 40–55 percent by weight of the powder should have a maximum dimension not exceeding 44 microns.

The powder thus formed has the properties of rapid cure and good shelf-life to a degree unexpected from the components involved. One particularly preferred composition, described in Example 1, is found to cure in 90 seconds at 232° C. The same cure rate is observed after the powder has been in storage for 4 weeks at 40° C.

In the prior art, use of epoxy resins and curing agents substantially similar to those used in the present invention produced powder coating compositions which required cure times, at commercially acceptable temperatures, in excess of 2 minutes to form smooth, flexible coatings. However, the present invention combines the components to produce synergistic results in a powder which not only cures in under 2 minutes but which also forms coatings which are adhesive, flexible, and smooth and even.

By comparison, an expoy resin powder coating composition, shown in the Dow Chemical Company Technical Data pamphlet entitled "Dow Experimental Hardener XD-8062" (page 8, Table III), Mar. 2, 1975, is reported to require 3–5 minutes to cure at 232° C. The composition shown in this reference contains two expoy/epoxy novolac resins and a curing agent substantially similar to components which partially comprise the composition of the present invention. While the coating formed by the composition is adhesive and impact resistant, it requires a longer cure time and exhibits less flexibility.

By way of further comparison, in the same reference there is shown (page 6, Table II, Column 2) an epoxy resin powder coating composition containing two epoxy resins which, with others, are used in the present invention. This composition is cured by a curing agent substantially similar to that used in the present invention. This reference composition exhibits acceptable film properties but requires 15 minutes to cure at 200° C.

It has been found that the composition of the present invention combines these epoxy and epoxy/epoxy novolac resins with a curing agent to produce a new powder coating composition exhibiting unexpected properties. The film properties equal or surpass in quality those exhibited by the compositions of the above reference and these properties are attained with cures of less than 2 minutes at commercially acceptable temperatures.

It has also been found that coatings formed from the compositions of this invention have excellent resistance to adhesion loss under cathodic protection. A procedure used to test this resistance is one in which a metal panel is coated, as described below, with the powder coating composition. A hole 3 mm. in diameter is drilled through the coating and part way into the panel. A piece of 10-cm diameter plastic pipe is adhesively bonded to the coating to provide a fluid-tight container with the hole at the center of the flat base of this container. The container is filled with a solution of 5% NaCl in water. A platinum wire is placed in the solution and a direct current potential of 6 volts is applied continuously between the wire and the metal panel, which acts as the cathode in this circuit. After 30 days, the voltage source is disconnected, the solution is poured off, and any disbonded coating is scraped away with a sharp knife, leaving an uncoated circle, the diameter of which is measured. Prior art pipe coatings which are used commercially leave an uncoated circle of 20-40 mm. diameter when subjected to this test. A preferred composition of the present invention leaves an uncoated circle of only 11-22 mm. diameter when subjected to this test.

The powder coating composition of this invention can be applied to a metal substrate by electrostatic spraying techniques or by using a fluidized bed which can be electrostatic. The preferable method is electrostatic spraying in which a voltage of 20-100 kilovolts is applied to the spray gun. The composition can be applied either in one pass or in several passes to provide variable thicknesses, after cure, of 0.2-0.5 mm. depending on the desired end-use of the coated article. Some pipes, for example, which are to be buried underground, require a coating thickness of approximately 0.4 mm.

The article to be coated can, optionally, be heated to any temperature up to approximately 270° C. prior to the application of the powder. Preheating the article provides better powder deposition and allows a more uniform coating.

After the application of the powder, the coated article is heated at 200°-280° C. for 1-2 minutes to fuse and to cure the powder particles into a substantially continuous uniform coating. The preferred temperature range is 230°-253° C. when the alkylimidazole content of the curing agent is 1-1.4 weight percent. Curing temperatures above 253° C. can sometimes produce a brittle coating. When the weight percentage of alkylimidazole in the curing agent exceeds 1.6, curing temperatures above 210° C. can sometimes produce a coating with poor appearance.

The composition of the invention can be applied directly to a metal surface, although for some end-uses a primer can be used. It is preferable that the surface to be coated be first cleaned by, for example, grinding or grit blasting.

The following examples illustrate the invention. In the examples, the components will be referred to according to the following numbering system:

(1) Epoxy resin having the formula

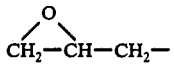

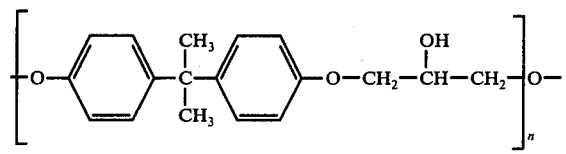

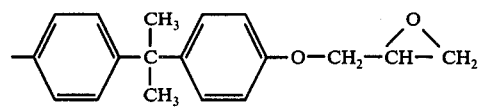

where $n$ is sufficiently large to provide a Gardner-Holdt viscosity of H-L measured at 40% polymer solids in diethylene glycol n-butyl ether at 25° C. and having an epoxide equivalent weight of 575-700

(2) Epoxy resin of the above formula but having a value for $n$ such that there is provided a Gardner Holdt Viscosity, measured as above, of K-P and an epoxide equivalent weight of 660-810.

(3) Epoxy/epoxy novolac resin which is an epoxy resin of the formula of (1) modified with an epoxy novolac resin of the formula

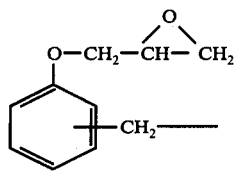

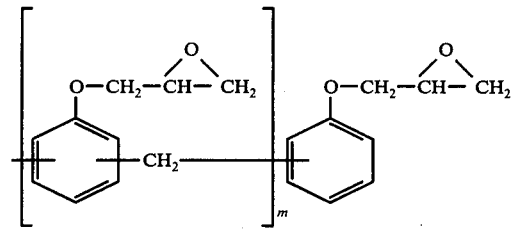

where $n$ of the epoxy resin and $m$ of the epoxy novolac resin have values sufficiently large to provide an epoxy/epoxy novolac resin having a Gardner-Holdt Viscosity of W-Z, measured as in (1) and an epoxide equivalent weight of 750-860

(4) Epoxy/epoxy novolac resin of the formula of (3) but having values for $n$ and $m$ sufficiently large to provide a Gardner-Holdt Viscosity of O-S, measured as in (1) and an epoxide equivalent weight of 500-575

(5) Silica particles, maximum dimension 10 microns (6) Curing agent which is a combination of:
   a. 70 parts by weight of a resin of the formula

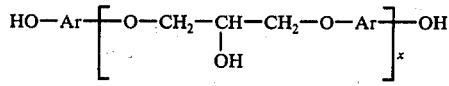

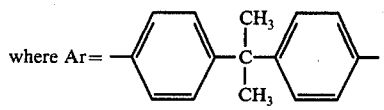

and x is approximately 3.8 corresponding to a weight average GPC molecular weight of 1312 based on a linear calibration curve obtained from narrow molecular weight polystyrene standards;
b. 30 parts by weight bisphenol-A; and
c. 1.3 parts by weight of 2-methylimidazole
(7) Titanium dioxide pigment
(8) Red Iron oxide pigment
(9) ModaFlow ®

EXAMPLE 1

The following components are blended together:

| Component | Parts by weight |
|---|---|
| 1 | 11.3 |
| 2 | 1.0 |
| 3 | 22.8 |
| 4 | 22.8 |
| 5 | 16.6 |
| 6 | 22.4 |
| 7 | 0.4 |
| 8 | 2.8 |
| 9 | 0.05 |

The above blend is charged into a melt extruder and extruded at 88°–94° C. The extrudate is then broken into chips and charged into a grinding mill where it is ground to a fine powder. The powder is then passed through a sieve which removes particles of maximum dimension greater than 150 microns.

The powder thus formulated can be stored for 4 weeks at 40° C. without appreciable loss of ability to cure rapidly or to form a smooth film.

Before application of the powder, a 3-mm. thick grit blasted steel panel to be coated in this example is heated to 253° C. The powder is then applied by Ransburg electrostatic powder guns. The guns use 60 volts of the electricity to charge the powder particles and 60 pounds per square inch air pressure to propel the particles which are fed to each gun, from a fluidized bed reservoir, by an air stream. The panel is then heated for 90 seconds at 232° C. The resulting film is smooth and even and is free from popping and cratering. The film thickness is approximately 0.3 mm.

The coated steel panel has a frontal impact resistance of 160 inch-pounds using a Gardner impact tester No. 16-1120. No visible cracks in the coating appear when the panel is bent 180° about a conically shaped mandrel varying from ⅛ inch to 1½ inches diameter over an 8-inch length. After repeated tests for adhesion loss under cathodic protection, as described above, the circular coating areas which delaminate have diameters which range from 11–22 mm., indicating little adhesion loss.

EXAMPLE 2

The following components are blended together:

| Component | Parts by weight |
|---|---|
| 1 | 23.0 |
| 2 | 2.0 |
| 3 | 34.7 |
| 5 | 16.6 |
| 6 | 20.6 |
| 7 | 0.4 |
| 8 | 2.8 |
| 9 | 0.1 |

The powder is formed as in Example 1. The powder of this example also can be stored for 4 weeks at 40° C. without appreciable loss of ability to cure rapidly or to form a smooth film.

The powder is applied to a panel as in Example 1. The panel is then heated, for purposes of curing, for 2 minutes at 232° C. If this particular composition is cured at a higher temperature, a brittle film can result.

The coated steel panel of this example has a frontal impact resistance of 160 inch-pounds using a Gardner impact tester No. 16-1120. No visible cracks in the coating appear when the panel is bent 180° around a conically shaped mandrel varying from ⅛ inch to 1½ inches diameter over an 8-inch length.

EXAMPLE 3

The composition, powder formation and application procedures of Example 1 are used to coat a 1½-foot length of 1½-inch inside diameter steel pipe. The edges of the pipe are uniformly coated and the coating along the pipe walls is substantially uniform, smooth and even, and free from popping and cratering.

What is claimed is:

1. A powder coating composition which consists essentially of finely divided particles at least 90 percent by weight of which have a maximum dimension not exceeding 150 microns wherein the particles are a blend of:
   (A) 9–25 parts by weight of an epoxy resin of the formula

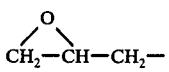

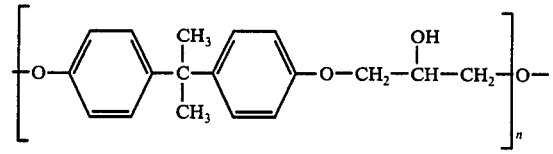

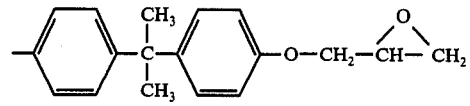

where n is sufficiently large to provide a resin having a Gardner-Holdt Viscosity of H-L measured at 40 percent polymer solids in diethylene glycol n-butyl ether at 25° C. and having an epoxide equivalent weight of 575–700;
   (B) 0.9–3 parts by weight of an epoxy resin having the same general formula as (A) but having a value for n sufficiently large to provide a resin having a Gardner-Holdt Viscosity of K-P measured as above and having an epoxide equivalent weight of 660–810;

(C) 20-38 parts by weight of an expoy/epoxy novolac resin which is an epoxy resin of the formula of (A) modified with an epoxy novolac resin of the formula

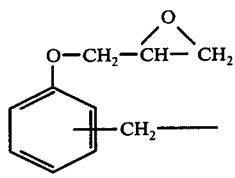

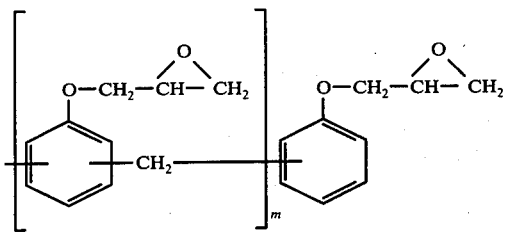

where n of the epoxy resin and m of the epoxy novolac resin have values sufficiently large to provide an epoxy/epoxy novolac resin having a Gardner-Holdt Viscosity of W-Z measured as in (A) and having an epoxide equivalent weight of 750-860;

(D) 0-25 parts by weight of an epoxy/epoxy novolac resin of the formula of (C) but having values for $n$ and $m$ sufficiently large to provide an epoxy/epoxy novolac resin having a Gardner-Holdt Viscosity of O-S measured as in (A) and having an epoxide equivalent weight of 500-575, wherein the parts by weight of components (C) and (D) total at least 34;

(E) 10-20 parts by weight of filler particles having a maximum dimension of 10 microns; and (F) 18-25 parts by weight of a resinous curing agent consisting essentially of:

(1) 68-81 parts by weight of a compound of the formula

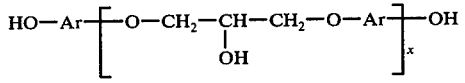

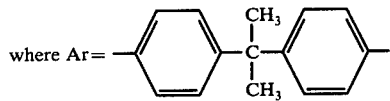

and where $x$ is a positive number sufficiently large to provide a compound with a weight average molecular weight of 1250-1600, as determined by Gel Permeation Chromatography based on a linear calibration curve obtained from narrow molecular weight polystyrene standards;

(2) 17-30 parts by weight of bisphenol-A; and (3) 0.6-2.0 parts by weight of an alkylimidazole in which the alkyl group contains 1-4 carbon atoms.

2. The powder coating composition of claim 1 containing pigment in a pigment to binder ratio of 3/100 to 30/100.

3. The powder coating composition of claim 1 containing up to 1 percent by weight, based on the weight of the composition, of a poly alkylacrylate as a flow control agent.

4. The powder coating composition of claim 1 containing up to 3 percent by weight, based on the weight of the composition, of fumed silica.

5. The powder coating composition of claim 1 in which the filler particles are silica, barium sulfate, or a mixture of these.

6. The powder coating composition of claim 5 having:
10-15 parts by weight of Component A;
22-30 parts by weight of Component C;
20-25 parts by weight of Component D; and
21-25 parts by weight of Component F.

7. The powder coating composition of claim 6 containing pigment in a pigment to binder ratio of 3/100 to 30/100.

8. The powder coating composition of claim 6 containing up to 1 percent by weight, based on the weight of the composition, of a poly alkylacrylate as a flow control agent.

9. A powder coating composition which consists essentially of finely divided particles at least 90 percent by weight of which have a maximum dimension not exceeding 150 microns wherein the particles are a blend of:

(A) 11-12 parts by weight of an epoxy resin of the formula

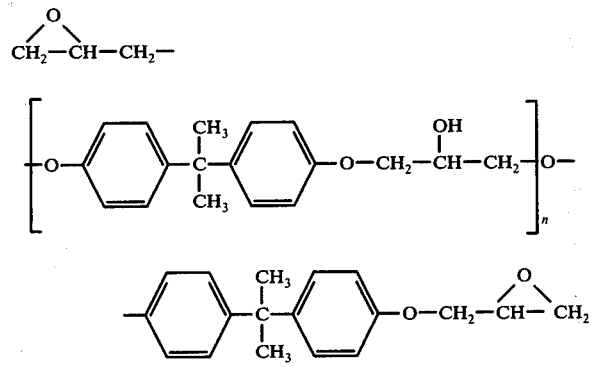

where $n$ is sufficiently large to provide a resin having a Gardner-Holdt Viscosity of H-L measured at 40 percent polymer solids in diethylene glycol n-butyl ether at 25° C. and having an epoxide equivalent weight of 575-700;

(B) 1 part by weight of an epoxy resin having the same general formula as (A) but having a value for $n$ sufficiently large to provide a resin having a Gardner-Holdt Viscosity of K-P measured as above and having an epoxide equivalent weight of 660-810;

(C) 22-23 parts by weight of an epoxy/epoxy novolac resin which is an epoxy resin of the formula of (A) modified with an epoxy novolac resin of the formula

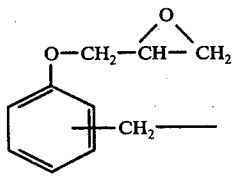

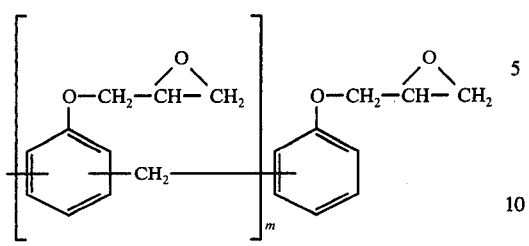

where $n$ of the epoxy resin and $m$ of the epoxy novolac resin have values sufficiently large to provide an epoxy/epoxy novolac resin having a Gardner-Holdt Viscosity of W-Z measured as in (A) and having an epoxide equivalent weight of 750-860;

(D) 22-23 parts by weight of an epoxy/epoxy novolac resin of the formula of (C) but having values for $n$ and $m$ sufficiently large to provide an epoxy/epoxy novolac resin having a Gardner-Holdt Viscosity of O-S measured as in (A) and having an epoxide equivalent weight of 500-575, wherein the parts by weight of components (C) and (D) total at least 34;

(E) 16-17 parts by weight of filler particles having a maximum dimension of 10 microns wherein the filler particles are silica, barium sulfate, or a mixture of these; and (F) 22-23 parts by weight of a resinous curing agent consisting essentially of:

(1) 68-81 parts by weight of a compound of the formula

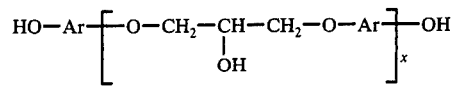

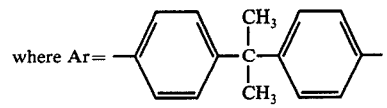

and $x$ is a positive number sufficiently large to provide a compound with a weight average molecular weight of 1250-1600, as determined by Gel Permeation Chromatography based on a linear calibration curve obtained from narrow molecular weight polystyrene standards;

(2) 17-30 parts by weight of bisphenol-A; and (3) 0.6-2.0 parts by weight of an alkylimidazole in which the alkyl group contains 1-4 carbon atoms.

10. The powder coating compositing of claim 9 containing pigment in a pigment to binder ratio of 3/100 to 30/100.

11. The powder coating composition of claim 9 containing up to 1 percent by weight, based on the weight of the composition, of a poly alkylacrylate as a flow control agent.

12. The powder coating composition of claim 9 in which:
component 1 of the curing agent is present in the amount of 70 parts by weight and has a molecular weight of 1312;
component 2 of the curing agent is present in the amount of 30 parts by weight; and
component 3 of the curing agent is 2-methylimidazole.

13. The powder coating composition of claim 9 containing up to 3 percent by weight, based on the weight of the composition, of fumed silica.

* * * * *